Dec. 17, 1968  M. P. ROUBIN ET AL  3,416,891
SOLID SOLUTIONS OF THE TRANSITION METAL NITRIDES AND
OXINITRIDES AND METHODS OF PREPARATION THEREOF
Filed Nov. 22, 1965

INVENTORS
MARC PIERRE ROUBIN
JACQUES NAURICE
RENE' ANTOINE
BY
ATTORNEY

United States Patent Office 3,416,891
Patented Dec. 17, 1968

3,416,891
SOLID SOLUTIONS OF THE TRANSITION METAL NITRIDES AND OXINITRIDES AND METHODS OF PREPARATION THEREOF
Marc Pierre Roubin, Jacques Maurice Pâris, and René Antoine Pâris, Lyon, France, assignors to Centre Nationale de la Recherche Scientifique, Paris, France
Filed Nov. 22, 1965, Ser. No. 509,094
Claims priority, application France, Nov. 27, 1964, 996,637
7 Claims. (Cl. 23—191)

ABSTRACT OF THE DISCLOSURE

The invention relates to a process for making solid solutions of nitrides and oxinitrides of the second to the seventh order of metals selected among Ti, Zr, Hf, V, Nb, Ta, Cr, Mo and W comprising coprecipitating hydrated metallic oxides or causing the simultaneous crystallization of isomorphous complex salts of the above ions and pyrolyzing the hydrated metallic oxides or the mixed complex salts obtained under a temperature less than 700° C. in an atmosphere of an ammonia containing gas.

---

Figure 1:
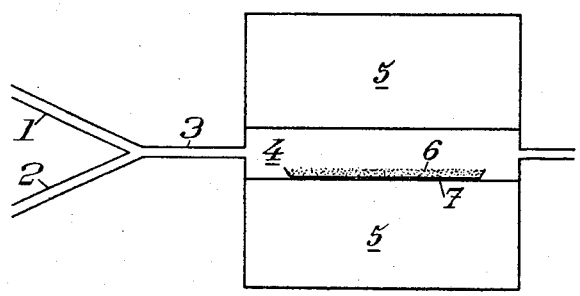

The invention pertains to solid solutions of nitrides and oxinitrides of transition metals and to their methods of preparation.

Two methods of preparation for such products are presently known. However they are burdened with factors which are difficult to overcome, as it will be seen herebelow, and further they cannot be carried out for obtaining solid solutions of nitrides or oxinitrides of a great number of elements.

According to the first of said methods, solid solutions are obtained by subjecting mixtures constituted by the corresponding simple nitrides to a temperature higher than 2000° C. for a prolonged period and under an inert atmosphere, which mixtures were previously brought under the form of a finely divided powder and sometimes agglomerated by compression.

It is difficult however to work the process and to maintain an inert atmosphere under so great temperatures and further to prevent the corrosion of the reaction vessels by the nitrides, such corrosion causing a pollution of the products obtained.

Further it is impossible, owing to the instability under such great temperatures of certain nitrides, for instance those containing chromium, to prepare all the solid solutions expected, in particular the cubic solutions of niobium and chromium oxinitrides.

Still another drawback is run across already during the preparation of the finely divided powder subsequent to the grinding and consecutive sintering of the simple nitrides and oxinitrides owing to their abrasive properties.

According to the second of said methods, alloys of the corresponding transition metals, obtained through sintering at 1500°, are subjected to the action of ammonia under a temperature ranging from about 650° to about 950° C. for a period ranging from 2 to 350 hours. This second process is very costly, in particular owing to the difficult preparation of these metallic alloys.

The object of the invention is to provide a new process for preparing solid solutions of nitrides and oxinitrides of such transition metals free from most of these drawbacks, in particular to provide a method which can be operated under much lower temperatures and which involves lower manufacturing costs.

Another object is to provide a method for preparing the solid solutions of the transition metals whose simple nitrides are instable at high temperatures.

Further another object of the invention is to prepare new pure and homogeneous binary solid solutions of a nitride of one of the metals selected in the group consisting of Ti, Zr, Hf, V, Ta, Mo, W with a nitride of niobium or of chromium.

Still another object of the invention is to obtain solid solutions of the 3rd to the 7th order (containing three to seven different metallic atoms) of metals selected from the group consisting of Ti, Zr, Hf, V, Ta, Nb, Cr, Mo and W, such solid solutions containing, if the case should be, not more than about 10% of oxygen.

Other objects of the invention will become apparent as the following description of the invention proceeds.

According to the method of the invention the solid solutions of the 2nd to the 7th order of the metals selected in the group of Ti, Zr, Hf, V, Nb, Ta, Cr, Mo, and W, are obtained by the action of ammonia in admixture, though not necessarily, with hydrogen under a temperature ranging from about 600 to 1500°, preferably from 800 to 1200°, either on mixed phases (solid solutions of oxides) or on intimate mixtures of reactive oxides, advantageously of oxides having a poor crystalline organization or at least crystalline particles as small as possible, whereby the desired solid solutions are obtained in the form of a powder, the particles of which are very small and exhibit a great chemical reactivity.

Concerning the above mixed phases, or the above intimate mixtures of reactive oxides, they are advantageously obtained by subjecting to a pyrolysis, at a temperature lower than 700° C. in an atmosphere constituted by ammonia in admixture, if the case should be, with hydrogen, either a coprecipitate of hydrated oxides or complexes (either monophaseous mixed complexes or an intimate mixture of simple complexes) which have themselves been obtained by the simultaneous crystallization of two or more metallic previously solubilized complexes.

The above coprecipitate by hydrated oxides is advantageously itself obtained by the action of ammonia on solutions containing the various corresponding metallic ions or through the hydrolysis of relatively instable complexes of the same ions in the presence of ammonia or urea.

Of course the preliminary step for preparing the above mentioned mixed phases or intimate mixtures of oxides, on the one hand, and the nitriding step, on the other hand, can be performed in a continuous manner, the temperature being controlled to be kept constant for a determined time when the pyrolysis has started for the sake of regularity, such temperature having previously been revealed by the short levelled portion of the decomposition curve of said phases or mixtures corresponding to the above mentioned pyrolysis occurring at a temperature lower than 700° C.

The products which are obtained by the methods according to the invention are characterized by a great fineness of their particles which confer to the same a great chemical reactivity. In particular those of the products which are obtained at the lowest temperatures (ranging from about 700° to about 800° C.) and which generally contain small amounts of oxygen, and therefore are designated by the term of "oxinitrides," are in the form of submicronic crystallites.

If it is desired to remove the oxygen or at least to decrease the content in oxygen of the solid solutions obtained, the temperature may be subsequently increased for instance to 1000° C., still under tthe same ammonia atmosphere, such an increase in temperature, however, involving an increase of the size of the crystallites, sometimes up to about 10 microns (it should be noted however that the determination of the size of the crystallites, which is generally appreciated by the width of the diffraction rays of the Debye-Scherrer diagrams, leads to only approximate results). The sizes of the ternary or quaternary solid solution particles are always smaller than those of the binary solid solutions obtained in the same conditions, the size of the former solid solutions remaining submicronic even under temperatures as high as 1000° to 1100° C.

Concerning the products which are obtained by the pyrolysis of the coprecipitates of hydrated oxides or of the intimate mixtures of complexes, the duration of their pyrolysis depends upon the used technics. This pyrolysis can be performed either in a fluidized bed or in a fixed bed, the former of these technics enabling smaller reaction periods.

Further the pyrolysis of mixed complexes or of intimate mixtures of complexes is more rapid than the pyrolysis of coprecipitates of hydrated oxides. At any rate however the duration of this pyrolysis is far shorter than the duration of the nitriding itself.

For the sake of illustration only, and to give an idea of the above durations, one can mention that in many instances the pyrolysis of the reactive oxides in a fixed bed is carried out within about an hour when the temperature is increased progressively until about 600° C., while the subsequent nitriding requires a temperature greater than 600° C. and a heating period of about 20 hours in the ammonia stream.

It has been observed that the pyrolysis of the mixed complexes occurs generally at a temperature of less than 500° C., whereas the pyrolysis of the coprecipitates of hydrated oxides can continue until temperatures superior to 600° C. However the dehydration is less violent in the case of the hydrated oxides whereas in the case of the pyrolysis of the mixed complexes, projections of material are frequently observed when said pyrolysis is performed in a fixed bed.

At the end of the pyrolysis mixed oxides or mixtures of oxides are obtained, the nitriding of which, in an ammonia atmosphere possibly containing hydrogen, starts when the temperature is raised above 600° C., such nitriding being also either carried out in a fixed bed or in a fluidized bed.

Figure 2:
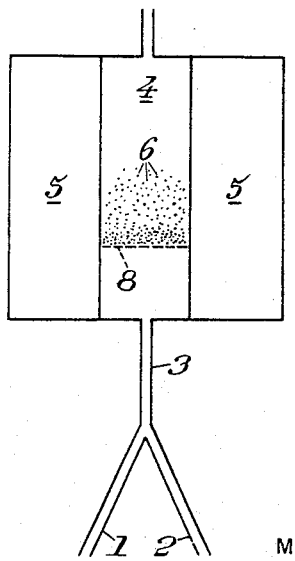

The pyrolysis and the nitriding may be carried out for instance with apparatuses diagrammatically illustrated in FIG. 1, which shows a device wherein the powder of reactive oxides is subjected to a leaking by the nitriding gaseous mixture and in FIG. 2, which shows an apparatus wherein the gaseous nitriding mixture passes through the entire mass of the oxide, this apparatus permitting the performance of the nitriding step either in a fixed bed or in a fluidized bed.

In the two instances ammonia and hydrogen arrive respectively through a pipe 1 and a pipe 2 which unite into a single pipe 3 which feeds the gaseous mixture within a chamber 4 heated by heating elements 5.

The chamber 4 of FIGURE 1 has a main horizontal axis, the product 6 being spread in a vessel 7 to form a thin layer, and the chamber 4 of FIGURE 2 has a vertical axis, the product 6 forming therein either a fixed layer or a fluidized bed above a grate 8.

The solid solutions of nitrides obtained after a nitriding over a period of about 20 hours may generally contain up to 10% by weight of oxygen in their lattice which, in most instances, belongs to the cubic system with centered faces owing to the fact that most of the simple nitrides or oxinitrides of the transition metals crystallize in a similar crystallographic system. However, other crystalline structures may be envisaged and it can be recalled that the two tantalum nitrides, i.e., TaN and Ta₂N, crystallize in the hexagonal system; that the chromium, the molybdenum and the tungsten respectively all have one nitride crystallizing in the cubic system with centered faces, on the one hand, and another nitride crystallizing in the hexagonal system, on the other hand; and finally that the niobium possesses nitrides which may crystallize in several phases, namely $\beta(NbN_{0.40}-NbN_{0.50})$ and $\epsilon(NbN_{1.00}-NbN_{1.018})$ which crystallize in the hexagonal system and $\delta(NbN_{0.88}-NbN_{0.93})$ which crystallizes in the cubic system with centered faces.

The identity of the crystallographic structures of a certain number of different nitrides involves their total miscibility. It has been observed that in most instances the process according to the invention permits to envisage the preparation of all their possible solid solutions with the whole range of the possible respective concentrations of each of their metallic ions. Thus concerning the binary solutions their general formula may be represented by $$A_xN, B_{1-x}N$$

in which A and B represent the atoms of two metals belonging to the group above mentioned and $x$ varies from 0 to 1, the ratio $A/B$ of said two metals, $x/1-x$, being equal to the ratio existing in the starting composition.

As it has already been mentioned above, the solid solutions of nitrides and oxinitrides are obtained in the form of extremely divided powders, in which the fineness of the particles is likely to be modified by subjecting these powders to an annealing step under a temperature higher than the nitriding temperature and in an atmosphere which is either inert (in such instance there is only an increase of the size of the crystals) or having reducing characteristics (whereby the powder might also be subjected to a chemical transformation leading to a removal of at least part of the oxygen or nitrogen).

In the case, for instance, of a mixed nitride obtained at a temperature of 800° C., the annealing step might be carried out in an inert atmosphere and under a temperature ranging from about 900° to about 1500°. Above about 1100° C. the crystallization of the powder becomes quite rapid. In such an instance only the increase in size of the crystals is observed. However if the solid solutions of nitrides obtained at a temperature of about 800° C. still contains a little oxygen the latter can be removed, at least partially, by subjecting said solid solution to a prolonged annealing, from at least 50 hours, under a reducing atmosphere (hydrogen) and at a temperature above 1000° C.

Figure 3:
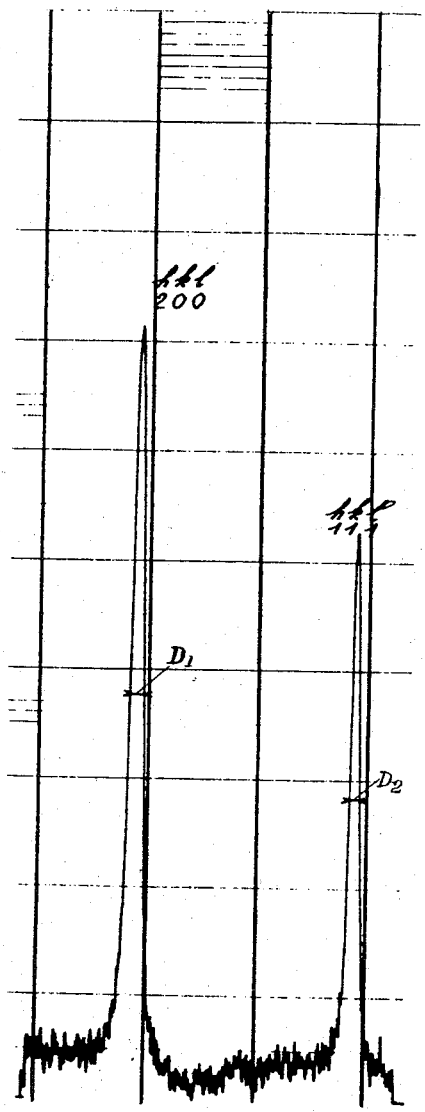
Figure 4:
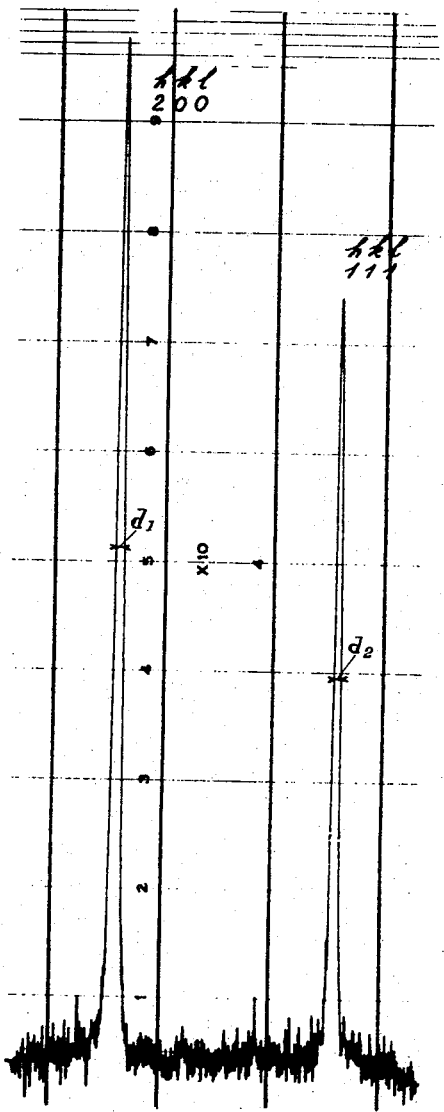

For the sake of illustrating the foregoing in connection with the evolution of the size of the powder particles, through annealing, the results of measures performed on two characteristic rays ($hkl$ 200 and 111) of the Debye-Scherrer diagram of a mixed nitride CrN–VN obtained, first, after the pyrolysis of the complex $$(NH_4)_3[Cr_x-V_{1-x}(C_2O_4)_3]3H_2O$$

and, second, after the subsequent nitriding of the mixed oxides resulting from said pyrolysis are shown in FIGS. 3 and 4 respectively.

These measures show that, in the case of a solid solution obtained at a temperature of 800° C., the two above mentioned rays present, at the half height of the picks they define (FIG. 3) widths $D_1$ and $D_2$ equal respectively to the 5/3 and 3/2 of the width $d_1$ and $d_2$ of the corresponding rays, at the same half height of the same solid solution after it has been subjected to an annealing treatment at 1000° C. (FIG. 4) in an inner atmosphere. One notes a simultaneous proportional increase of the height of these rays after said annealing treatment.

The powders of the finely divided solutions obtained by the method according to the invention show a remarkable chemical activity. They dissolve far more easily in acid solutions than the solid solutions of nitrides obtained by the previously known processes. Further the solid solutions obtained according to the new method react far more easily, at low temperature, than the solid solutions formerly prepared with the oxygen of air. This chemical activity is, as a matter of fact, evidenced by the reaction of hydrogen with the highly pulverulent mixed oxinitride during the annealing of the same under a reducing atmosphere consisting of hydrogen.

It has been indicated above that the duration of the nitriding step itself is of about 20 hours but in many instances the complete nitriding will be performed in a much shorter time. The duration of 20 hours is set forth only to indicate that the nitriding reaction will, in any case, be achieved if the operator wishes to dispense with the analytic checking of the complete accomplishment of the reaction. But when it is desired to operate within shorter periods of time the transformation rate of the starting material into the desired solid solution will have to be determined, at first, by radiocrystallographic analyses which can be completed advantageously by chemical analyses.

If the reaction is not ended the diagram of the uncompleted nitride mixture will exhibit, in addition to the large and intense rays of the nitride solid solution formed, other less intense rays corresponding to the fraction of mixed oxides which did not yet react. When the reaction is ended the diagram records only the intense rays of the desired solid solution.

The quantitative chemical analysis of the different metals and of the nitrogen present in the solid solution will permit to assess the composition of the monophased product obtained. Generally the addition of these weight percentages leads to a sum comprised between 99 to 100% of the total weight of the sample analyzed.

In certain instances this sum is lower than 99% (it is then generally comprised between 95 and 99%), such results meaning that atoms of oxygen remain in the crystalline lattice of the solid solution, which then constitutes a solid solution of oxinitrides, i.e. a monophased solid the crystalline lattice of which contains the different metals, nitrogen and oxygen.

The process according to the invention enables the preparation of a large number of new solid solutions of transition metal nitrides, which had never been prepared up to the present time, in particular, on the one hand, of the pure and homogeneous binary solid solutions of the chromium and niobium nitrides with the nitrides of one of the metals selected in the group consisting of Ti, Zr, Hf, V, Ta, Mo and W and, on the other hand, of solid solutions of the 3rd to the 7th order with metals of the group Ti, Zr, Hf, V, Nb, Ta, Cr, Mo and W, more particularly of the solid solution of plural order of the group of metals Ti, V, Nb, Ta and Cr, these solutions containing from 0% to not more than 10% of oxygen.

These nitride solutions present an important industrial interest in that they constitute excellent catalysts which are used, preferably in connection with the synthesis of ammonia. Moreover they can be used as supports for other catalysts.

They can also be used either alone or in combination with other components for constituting cermet-like refractory materials and semi-conductor materials.

The invention will be further described in the following non limitative examples:

Example I

Binary solid solutions of titanium and vanadium nitrides having the general formula TiN-Vn are prepared starting from the mixed oxalic complex having the general formula $$(NH_4)_2[(TiO)_x(VO)_{1-x}(C_2O_4)_2]2H_2O$$

which can be easily obtained by the simultaneous crystallization of isomorphous simple complexes having respectively the formula

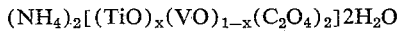
$$(NH_4)_2[TiO(C_2O_4)_2],3,5H_2O$$

and

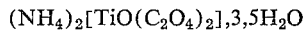
$$(NH_4)_2[VO(C_2O_4)_2],2H_2O$$

It is possible to prepare the whole range of the solid solutions of these nitrides with the corresponding varying contents of titanium and vanadium dependent upon the ratio of the above complexes in the starting mixture which can be varied at will, $x$ then varying from 0 to 1.

The above mixed oxalic complexes are first subjected to a decomposition in a gaseous stream constituted of equal proportions of ammonia and hydrogen at a flow rate of 10 liters per hour, under a temperature not higher than 300° C. A solid solution of the oxides $V_2O_3$ and $Ti_2O_3$ is obtained and which does not exhibit any noticeable nitriding.

The nitriding of this last solid solution is obtained by raising the temperature up to 1000° C. and by maintaining the mixed oxide complex in the gaseous stream $NH_3+H_2$ for about 20 hours, during which the content of oxygen of the mixed crystals decreases progressively.

The final nitriding product is constituted by a yellow bronze coloured and finely divided powder corresponding to the solid solution TiN-VN free from oxygen.

Example II

Solid solutions of chromium and vanadium nitrides of general formula CrN-VN containing, possibly, small amounts of oxygen in their cubic crystalline lattices are obtained starting from oxalic complexes having the general

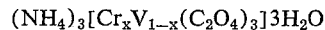
$$(NH_4)_3[Cr_xV_{1-x}(C_2O_4)_3]3H_2O$$

which can be obtained very easily by the simultaneous crystallization of the mixed isomorphous complexes

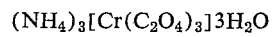
$$(NH_4)_3[Cr(C_2O_4)_3]3H_2O$$

and

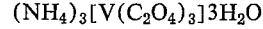
$$(NH_4)_3[V(C_2O_4)_3]3H_2O$$

The ratios of these two complexes can be varied in the whole possible range ($x$ varying from 0 to 1) whereby all the possible solutions of the nitrides CrN and VN can be obtained.

The above oxalic complexes are subjected to a decomposition under a temperature of about 300° C. and in an ammonia and hydrogen stream, the flow-rate of which is 10 liters per hour.

A solid solution of oxides $Cr_2O_3$ and $V_2O_3$ is obtained in the form of a residue which does not show any appreciable nitriding.

The temperature is then raised and maintained at 800° C. for 20 hours while the solid solutions of these oxides is maintained in contact with the above ammonia-hydrogen stream, whereby a residue constituted by a finely crystallized cubic phase containing less than 2% of oxygen is obtained.

When the same reaction is performed under a temperature of reaction of 1000° C. a product constituted by a well crystallized solid solution CrN-VN free from oxygen is obtained after 20 hours of reaction.

Example III

The purpose being to prepare binary cubic solid solutions of niobium and titanium nitrides which general formula is

NbN-TiN one starts with the preparation of an intimate mixture of two oxalates:

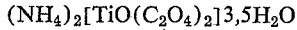
$$(NH_4)_2[TiO(C_2O_4)_2]3,5H_2O$$

and

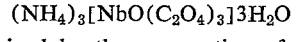
$$(NH_4)_3[NbO(C_2O_4)_3]3H_2O$$

which is obtained by the evaporation of a solution, in ammonium oxalate, of suitable proportions of hydrated niobium oxide

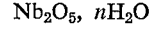
$$Nb_2O_5, nH_2O$$

and of hydrated titanium oxide

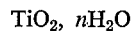
$$TiO_2, nH_2O$$

The above oxalic complexes are heated to a temperature of 400–500° C. in an ammonia and hydrogen stream, the flow-rate of which is 10 liters per hour, during one hour. The residue of this pyrolysis is then heated still under the same atmosphere, Either at 800° C. during 20 hours whereby a mixed nitride NbN-TiN finely crystallized (large rays on the X-rays diagram) containing less than 10% in weight of oxygen is obtained, Or at 1000° C., during 20 hours whereby a well crystallized residue (evidenced by the narrow rays of the X-rays diagram) and containing less than 5% in weight of oxygen is obtained.

It is underlined that less than 1% in weight of oxygen in the solid solution of the NbN-TiN is sufficient to keep a cubic crystalline lattice with centered faces. Phases showing a content in oxygen of such an order of magnitude may be obtained in maintaining the action of hydrogen and ammonia at 1000° C. during 50 hours.

Example IV

Binary cubic solid solutions of tantalum and vanadium nitrides the general formula of which is TaN-VN are prepared starting from an intimate mixture of the two next oxalates $(NH_4)_2[VO(C_2O_4)_2]2H_2O$ and $(NH_4)_3[TaO(C_2O_4)_3]3H_2O$ Which are obtained by evaporating a solution prepared by dissolution, in acid oxalate of ammonium, of hydrated oxydes of tantalum ($Ta_2O_5$, $nH_2O$) and of vanadium ($V_2O_5$, $nH_2O$) in suitable proportions.

This mixture of oxalic complexes is first subjected during one hour, to a decomposition under a temperature of 400–500° C. in an atmosphere constituted by a gaseous stream at a flow rate of 10 liters of ammonia and 10 liters of hydrogen per hour. The residue obtained is brought to a temperature of 900° for 20 hours, thereby providing a cubic solid solution TaN-VN containing less than 5% in weight of oxygen. Here again a slight proportion of oxygen (less than 1% in weight) is sufficient to maintain a cubic crystalline lattice in the mixed phase.

Example V

Binary cubic solid solutions of chromium and titanium nitrides which general formula is CrN-TiN are prepared starting from a coprecipitate of hydrated oxides $Cr_2O_3$, $nH_2O$ and $TiO_2$, $nH_2O$ An aqueous solution containing suitable proportions of chromium nitride (oxidation degree III) and titanium sulfate (oxidation degree IV) is treated with ammonia. The precipitate obtained is filtered, washed and dried in a hot chamber (120°) during 12 h.

The dried and highly pulverulent product is heated during one hour at a temperature of 600–700° C. in an atmosphere constituted by a stream of ammonia and hydrogen (the flow-rates of which are both 10 liters per hour). The residue of this pyrolysis being then, still in the same atmosphere, brought to a temperature of 800° C., whereby a cubic solid solution of nitride CrN-TiN finely crystallized and containing less than 2% in weight of oxygen is obtained; in raising the temperature to 1000° C. instead of 800° C. the cubic mixed phase obtained is absolutely free from oxygen.

Example VI

Cubic solid solutions of niobium and titanium nitrides, the general formula of which is NbN-TiN are prepared starting from a coprecipitate of hydrated oxides $Nb_2O_5$, $nH_2O$ and $TiO_2$, $nH_2O$ To this end, calcinated oxides $Nb_2O_5$ and $TiO_2$ are dissolved in molten potassium pyrosulfate; after cooling, the resulting solid is treated with boiling water; to this solution is added ammonia in excess. The precipitate obtained is filtered, washed and then dried in a drying hot chamber (120° C.) during 12 h.

The solid product thus obtained, finely ground, is first subjected to a heating under 600–700° C. during one hour in an atmosphere constituted with a stream of ammonia, the flow-rate of which is 10 liters per hour, and with a stream of hydrogen the flow-rate of which is also 10 liters/h. The residue obtained is then brought to 900° C. during 20 hours in the same atmosphere.

The mixed phases obtained in these conditions are absolutely identical to those prepared by the analogous treatment of niobium and titanium oxalic complexes. (See Example III.)

Example VII

Ternary cubic solid solution of niobium, tantalum and titanium nitrides, the general formula of which is NbN-TaN-TiN are prepared starting from a coprecipitate of hydrated oxides $Nb_2O_5$, $nH_2O$-$Ta_2O_5$, $nH_2O$-$TiO_2$, $nH_2O$ To this end suitable proportions of calcinated oxides $Nb_2O_5$-$TaO_2$ and $TiO_2$ are dissolved in molten potassium pyrosulfate. After cooling, the resulting solid is treated with boiling water; the solution thus obtained is treated with ammonia in excess. The precipitate is filtered and washed and then dried in a drying hot chamber (120°) during 12 hours.

The solid compound, finely ground is subjected first to a heating, during one hour, at a temperature of 600° C.–700° C. in an atmosphere constituted by a stream of ammonia (10 liters per hour) and by a stream of hydrogen (10 liters per hour), the residue being then heated to 1000° C. during 20 hours in the same atmosphere. The residue thus obtained is constituted by a ternary mixed phase finely crystallized of NbN-TaN-TiN nitrides, containing less than 5% in weight of oxygen.

It must be noted that the results are identical when an intimate mixture of the three following oxalates (obtained by a process similar to the one described in Example IV)

$(NH_4)_3[NbO(C_2O_4)_3]3H_2O$ $(NH_4)_3[TaO(C_2O_4)_3]3H_2O$ and $(NH_4)_2[TiO(C_2O_4)_2]3,5H_2O$ are nitrided under analogous conditions.

Example VIII

Quaternary cubic solid solutions of chromium, niobium, titanium and vanadium nitrides, the general formula of which is CrN-NbN-TiN-VN are prepared starting from a coprecipitate of hydrated oxides $Cr_2O_3$, $nH_2O$-$Nb_2O_5$, $nH_2O$-$TiO_2$, $nH_2O$-$V_2O_5$, $nH_2O$. To this end, suitable proportions of calcinated oxides $Cr_2O_3$, $Nb_2O_5$, $TiO_2$ and $V_2O_5$ are dissolved in molten potassium pyrosulfate, and then subjected to the same treatment as in Example VII.

After a decomposition of the coprecipitated salts by a heating at 600–700° C. during one hour in an atmosphere constituted by ammonia and hydrogen, the temperature of the obtained residue is raised to 1000° C. in an atmosphere constituted by an ammonia stream, the flow-rate of which is 10 liters per hour, and a stream of hydrogen of the same flow rate; this leads to a quaternary phase of CrN-NbN-TiN-VN nitrides, finely crystallized (large rays of the X-rays diagram) and containing less than 5% in weight of oxygen.

In prolonging the time of nitriding, still at 1000° C., the degree of crystalline organization of the quaternary phase is improved, while its content in oxygen is lowered to less than 1% in weight, without alteration of the cubic structure of its crystalline lattice.

In a general manner, while the above description discloses what are deemed to be practical and efficient embodiments of the present invention, said invention is not limited thereto as there might be changes made in the steps of the process without departing from the principle of the present invention as comprehended within the scope of the appended claims.

What is claimed is:

1. A method for preparing solid solutions of nitrides and oxinitrides of the second to the seventh order, of the metals selected in the group consisting of titanium, zirconium, hafnium, vanadium, niobium, tantalum, chromium molybdenum and tungsten which comprises, in a first step coprecipitating hydrated metallic oxides from solutions of the salts of two to seven metallic ions with an alkaline agent, in a second step pyrolysing the hydrated metallic oxides obtained under a temperature less than 700° C. in an atmosphere of an ammonia containing gas and, in a third step, reacting the residue of pyrolysis with an ammonia containing gas under temperatures ranging from about 800° C. to about 1200° C.

2. A method according to claim 1 wherein said ammonia containing gas also contains hydrogen.

3. A method according to claim 1 wherein said third step is carried out immediately after said second step in a continuous manner.

4. A method for preparing solid solutions of nitrides and oxinitrides, of the second to the seventh order, of the metals selected in the group consisting of titanium, zirconium, hafnium, vanadium, niobium, tantalum, chromium, molybdenum and tungsten which comprises, in a first step causing the simultaneous crystallization of two to seven isomorphous soluble complex salts of the above ions from a common solution thereof, in a second step pyrolysing the mixed complex obtained under a temperature less than 700° C. in an atmosphere of an ammonia containing gas and, in a third step reacting the residue of pyrolysis with an ammonia containing gas under temperatures ranging from about 800° C. to about 1200° C.

5. A method according to claim 4 wherein said ammonia containing gas also contains hydrogen.

6. A method according to claim 1 wherein said hydrated metallic oxides are coprecipitated in said first step with ammonia.

7. A method according to claim 4 wherein the isomorphous soluble complex salts subjected to simultaneous crystallization in said first step are oxalic complex salts.

References Cited

UNITED STATES PATENTS

| 2,606,815 | 8/1952 | Sowa | 23—191 |
| 2,645,575 | 7/1953 | Herres et al. | 148—13 X |
| 3,253,886 | 5/1966 | Lamprey et al. | 23—134 |

OTHER REFERENCES

Schönberg, nils; ACTA Chemica Scandinavica, vol. 8, Part 1, 1954, pp. 213–14, 219–20; Einer Munksgaard, Copenhagen.

Schwarzkopf P. and Kieffer R.; Refractory Hard Metals, pp. 223–4, 260–62; The Macmillan Co., N.Y., 1953.

EARL C. THOMAS, *Primary Examiner.*

G. O. PETERS, *Assistant Examiner.*

U.S. Cl. X.R.

106—55

UNITED STATES PATENT OFFICE
CERTIFICATE OF CORRECTION

Patent No. 3,416,891                              December 17, 1968

Marc Pierre Roubin et al.

It is certified that error appears in the above identified patent and that said Letters Patent are hereby corrected as shown below:

In the drawings, sheets 1 and 2, line 2 thereof, the lower right-hand corner, "JACQUES NAURICE", each occurrence, should read -- JACQUES MAURICE --. In the heading to the printed specification, line 7, "Nationale" should read -- National --.

Signed and sealed this 17th day of March 1970.

(SEAL)
Attest:

Edward M. Fletcher, Jr.                      WILLIAM E. SCHUYLER, JR.

Attesting Officer                                Commissioner of Patents